United States Patent
Farrell et al.

(10) Patent No.: US 7,900,895 B1
(45) Date of Patent: Mar. 8, 2011

(54) COUNTER CURRENT SUPERSATURATION OXYGENATION SYSTEM

(76) Inventors: Dean E. Farrell, Palm Springs, CA (US); Ronald W. Keller, Canby, CA (US)

( * ) Notice: Subject to any disclaimer, the term of this patent is extended or adjusted under 35 U.S.C. 154(b) by 0 days.

(21) Appl. No.: 12/856,692

(22) Filed: Aug. 16, 2010

(51) Int. Cl.
*B01F 3/04* (2006.01)

(52) U.S. Cl. .................. 261/77; 261/122.1; 261/126

(58) Field of Classification Search ............ 261/28, 261/77, 122.1, 124, 126, DIG. 70
See application file for complete search history.

(56) References Cited

U.S. PATENT DOCUMENTS

| | | | |
|---|---|---|---|
| 3,643,403 A | | 2/1972 | Speece |
| 4,183,787 A | * | 1/1980 | Roesler et al. ............... 435/43 |
| 4,217,211 A | | 8/1980 | Crane |
| 4,246,111 A | * | 1/1981 | Savard et al. ............. 210/96.1 |
| 4,278,546 A | * | 7/1981 | Roesler ...................... 210/626 |
| 4,304,665 A | * | 12/1981 | Hines ......................... 210/194 |
| 4,338,197 A | * | 7/1982 | Bolton ........................ 210/621 |
| 5,342,781 A | * | 8/1994 | Su ............................ 435/296.1 |
| 5,620,593 A | * | 4/1997 | Stagner ...................... 210/90 |
| 5,651,939 A | * | 7/1997 | Murrer et al. .............. 422/28 |
| 6,017,020 A | * | 1/2000 | Baughman et al. ......... 261/36.1 |
| 6,322,055 B1 | * | 11/2001 | Speece ....................... 261/77 |
| 6,514,410 B1 | * | 2/2003 | Gantzer ...................... 210/605 |
| 2005/0056431 A1 | * | 3/2005 | Harrington et al. ........ 166/372 |

FOREIGN PATENT DOCUMENTS

FR  2 671 456 A1 * 7/1992

OTHER PUBLICATIONS

Oxygen Supplementation, A New Technology in Fish Culture, U.S. Department of Interior Fish and Wildlife Service Region 6, Information Bulletin, pp. 407-408.

* cited by examiner

*Primary Examiner* — Scott Bushey
(74) *Attorney, Agent, or Firm* — Donald J. Ersler

(57) ABSTRACT

A counter current supersaturation oxygenation system preferably includes a down flow tube, an upflow tube and a gas diffuser. The gas diffuser preferably includes a porous tube and a support frame. The porous tube is preferably wrapped in a spiral from a bottom of the support frame to a top of the support frame. A non-porous gas supply hose is connected to the porous tube. The gas diffuser is suspended inside the down flow tube at substantially a bottom thereof. One end of the upflow tube is connected to substantially a bottom of the down flow tube. A second embodiment of the counter current supersaturation oxygenation system preferably includes a down flow tube, the gas diffuser and a buoyant platform. A stream of liquid becomes oxygenated by passing down the down flow tube. The oxygenated liquid may flow up the upflow tube or down to any appropriate destination.

14 Claims, 4 Drawing Sheets

COUNTER CURRENT SUPERSATURATION OXYGENATION SYSTEM

BACKGROUND OF THE INVENTION

1. Field of the Invention

The present invention relates generally to supersaturating a liquid with a gas containing oxygen and more specifically to a counter current supersaturation oxygenation system, which enables oxygen supersaturation of a liquid.

2. Discussion of the Prior Art

U.S. Pat. No. 3,643,403 to Speece discloses a downflow bubble contact aeration apparatus and method. The Speece patent includes the aeration of oxygen deficient water by dispersing bubbles of air or oxygen gas in a forced downflow of water through a downwardly diverging funnel trapping the bubbles therein for a prolonged contact with water. However, Speece must use water under pressure to properly oxygenate the water.

U.S. Pat. No. 4,217,211 to Crane discloses a pressurized treatment of sewage. The Crane patent includes passing a liquor of the sewage into a subterranean shaft through an inner shaft, which extends only partway down into a deep subterranean shaft. A mixing shaft is located at a lower proximity of the inner shaft. The descending sewage liquor passes downwardly through the mixing nozzles to the bottom of the subterranean shaft.

U-tubes are known in the art and include a vertical shaft 30-150 feet deep, which is either partitioned into two sections or consisting of two concentric pipes. Oxygen is sparged at the top of the down-leg of the U-tube and is transferred into a gas-liquid mixture. The gas-liquid mixture exits an up-leg of the U-tube. However, U-tubes oxygenate a water stream at a top of the intake, which results in less efficient oxygenation of the water stream.

Accordingly, there is a clearly felt need in the art for a counter current supersaturation oxygenation system, which enables a more efficient oxygen supersaturation of a liquid than that of the prior art and which does not require the use of pressurized water.

SUMMARY OF THE INVENTION

The present invention provides a counter current supersaturation oxygenation system, which enables oxygen supersaturation of a liquid. The counter current supersaturation oxygenation system preferably includes a down flow tube, an upflow tube and a gas diffuser. The down flow tube is preferably a subterranean shaft, if the down flow tube is formed in the ground. The gas diffuser preferably includes a porous tube and a support frame. The support frame includes a substantial funnel shape with a large perimeter disposed on a bottom thereof. The porous tube is preferably wrapped in a spiral from a bottom of the support frame to a top of the support frame.

A pneumatic T-connector includes a first end leg, a second end leg and a T-leg. A non-porous gas supply hose is connected to the first end leg. One end of the porous tube is connected to the second end leg and the other end of the porous tube is connected to the T-leg. Preferably, a supply of at least 93 percent pure oxygen is supplied to the porous tube through the gas supply hose. The gas diffuser is suspended inside the down flow tube, above an entrance to the upflow tube. One end of the upflow tube is connected to substantially a bottom of the down flow tube, below the gas diffuser. The other end of the upflow tube extends above the gas diffuser. The upflow tube is preferably located outside the down flow tube to minimize turbulence, but could also be located inside the down flow tube.

A second embodiment of the counter current supersaturation oxygenation system preferably includes a down flow tube, the gas diffuser and a buoyant platform. The buoyant platform is set in a body of liquid, such as a retaining pond, a pond or a lake. A top of the down flow tube is retained by the buoyant platform. The gas diffuser is suspended inside the down flow tube at substantially a bottom thereof. If the upflow tube is needed, because of a thermocline in the body of liquid, a top of the upflow tube is retained in the buoyant platform adjacent the down flow tube. A pump is used to transfer liquid from the upflow tube to substantially the top of the down flow tube. An entrance to the upflow tube is located above a bottom of the down flow tube or below a thermocline in the body of liquid. The liquid in the body of liquid is oxygenated by the gas diffuser.

A stream of liquid is flowed down the down flow tube. The stream of liquid becomes oxygenated by passing down the down flow tube. Oxygen passes up from the gas diffuser and into the stream of liquid at a rise rate slightly above the down flow water velocity. The oxygenated liquid flows up the upflow tube. The depth and perimeter of the down flow tube is determined by the oxygenation needs of the liquid.

Accordingly, it is an object of the present invention to provide a counter current supersaturation oxygenation system, which enables more efficient oxygen supersaturation of a liquid than that of the prior art.

These and additional objects, advantages, features and benefits of the present invention will become apparent from the following specification.

DETAILED DESCRIPTION OF THE PREFERRED EMBODIMENTS

Figure 1:
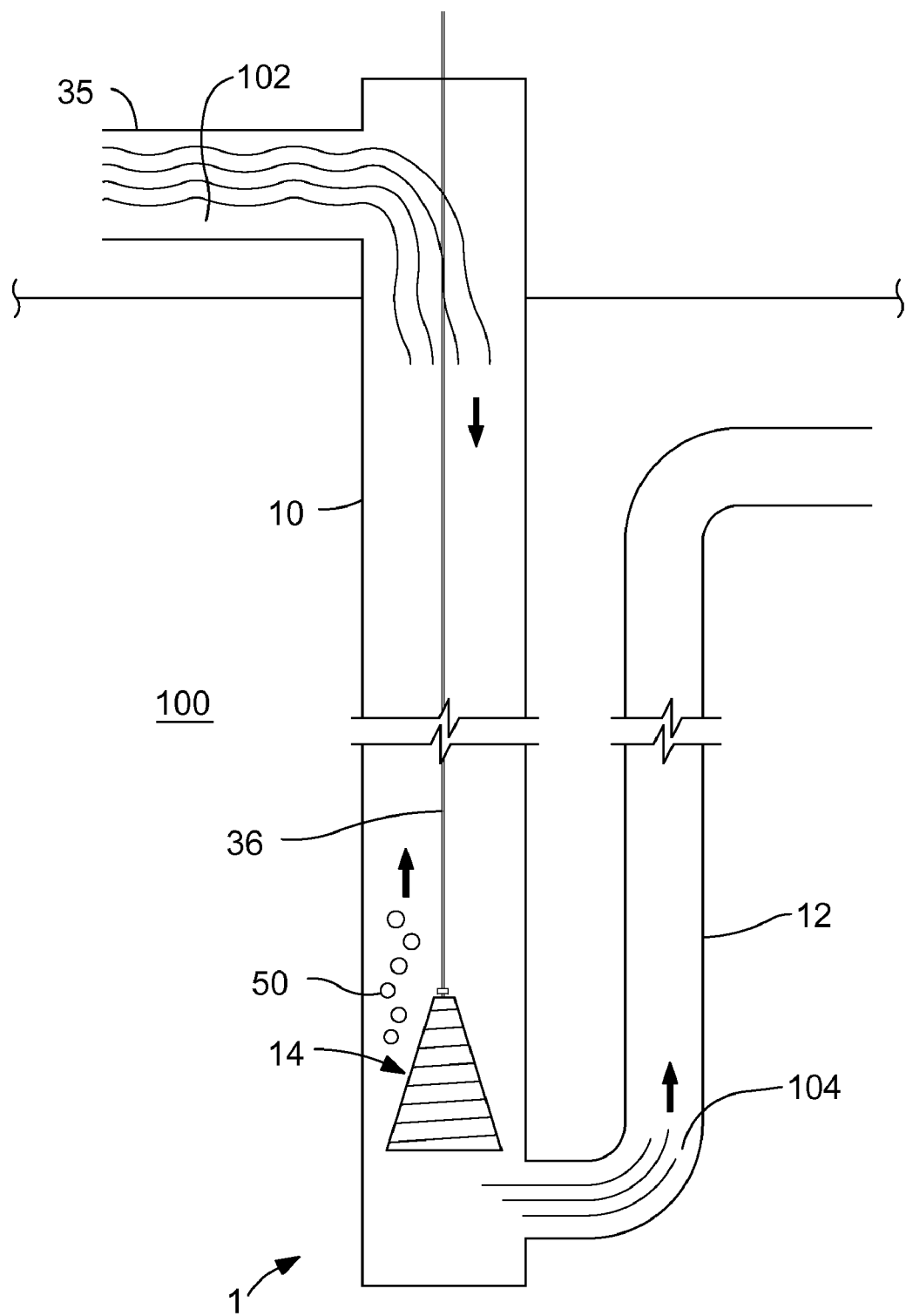
FIG. 1 is a cross sectional view of a counter current supersaturation oxygenation system with an upflow tube located outside a down flow tube in accordance with the present invention.

With reference now to the drawings, and particularly to FIG. 1, there is shown a cross sectional view of a counter current supersaturation oxygenation system 1. The counter current supersaturation oxygenation system 1 preferably includes a down flow tube 10, an upflow tube 12 and a gas diffuser 14. The down flow tube 10 is preferably a subterranean shaft, if the down flow tube 10 is formed in the ground 100. The down flow tube 10 has a substantially vertical axis.

Figure 4:
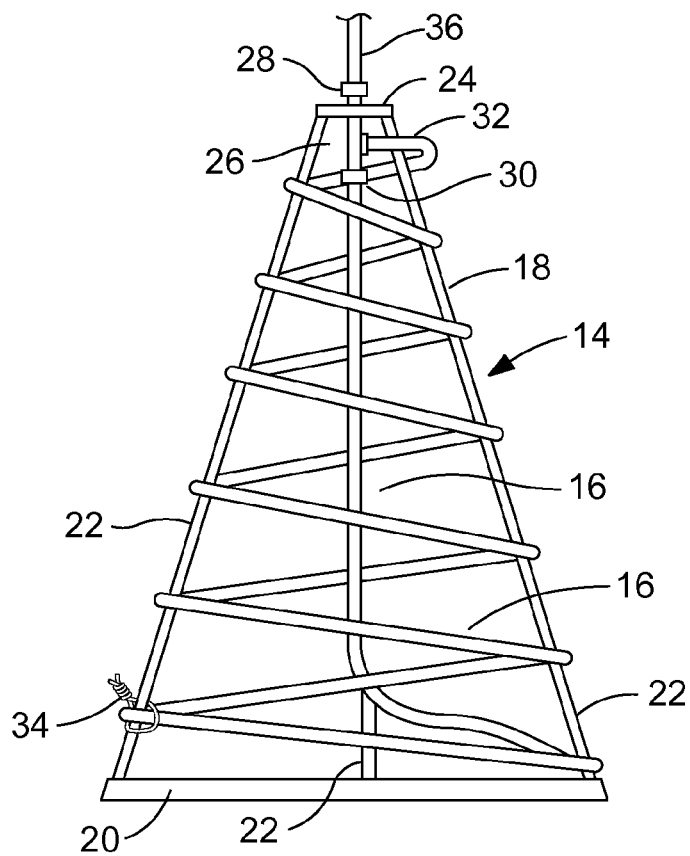
FIG. 4 is a side view of a gas diffuser of a counter current supersaturation oxygenation system in accordance with the present invention.
Figure 5:
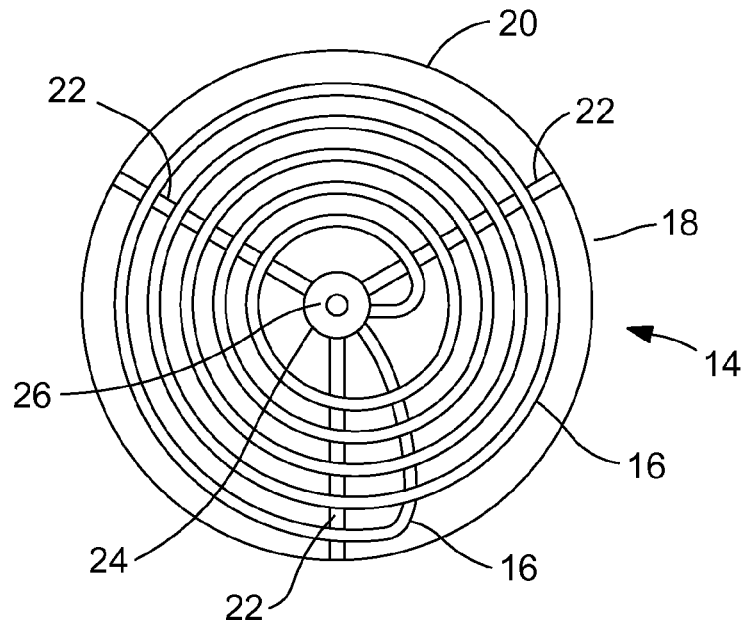
FIG. 5 is a top view of a gas diffuser of a counter current supersaturation oxygenation system in accordance with the present invention.

With reference FIGS. 4-5, the gas diffuser 14 preferably includes a porous tube 16 and a support frame 18, but other designs of gas diffusers could also be used. Pressurized oxygen is emitted throughout the surface area of the porous tube 16. Preferably, the oxygen supplied through the porous tube 16 is at least 93 percent pure. A source of oxygen may be an oxygen generator, a supply liquid oxygen or any other appropriate oxygen source. The support frame 18 preferably includes a lower ring 20, a plurality of support rods 22 and a top plate 24. One end of the plurality of supports rods 22 are attached to the lower ring 20 with welding or the like and the other end of the plurality support rods 22 are attached to the top plate 24 with welding or the like. The lower ring 20 has a larger perimeter than the top plate 24, which causes the support frame 18 to have a substantial funnel shape.

A pneumatic T-connector 26 includes a first end leg 28, a second end leg 30 and a T-leg 32. The porous tube 16 is preferably wrapped around the plurality of support rods 22 in a spiral from the lower ring 20 to the top plate 24. The porous tube 16 is preferably secured to the plurality of support rods 22 with a plurality of wires 34 twisted around the porous tube 16 and the plurality of support rods 22 at a plurality crossing points, but other securement methods may also be used. A non-porous gas supply hose 36 is secured to the first end leg 28 of the pneumatic T-connector 26 with a first hose clamp or the like. One end of the porous tube 16 is secured to the second end leg 30 with a second hose clamp or the like and the other end of the porous tube 16 is secured to the T-leg 32 with a third hose clamp or the like. The gas diffuser 14 is suspended by the gas supply hose 36 inside the down flow tube 10 and at substantially a bottom thereof. An entrance to the upflow tube 12 is located below the gas diffuser 14. The bottom of the down flow tube 10 is located lower than the entrance to the upflow tube 12 to handle the air lift effect.

One end of the upflow tube 12 is connected to substantially a bottom of the down flow tube 10. An entrance to the upflow tube 12 is located below the gas diffuser 14. The other end of the upflow tube 12 extends at least above the gas diffuser 14. A liquid supply tube 35 supplies liquid 102 to a top of the down flow tube 10. The liquid supply tube 35 receives liquid stored at a higher level than an entrance to the down flow tube 10 or any suitable pump is used to lift the liquid to a height of at least 3 feet. It is preferable to locate the upflow tube 12 outside the down flow tube 10 to minimize turbulence in the down flow tube 10.

Figure 2:
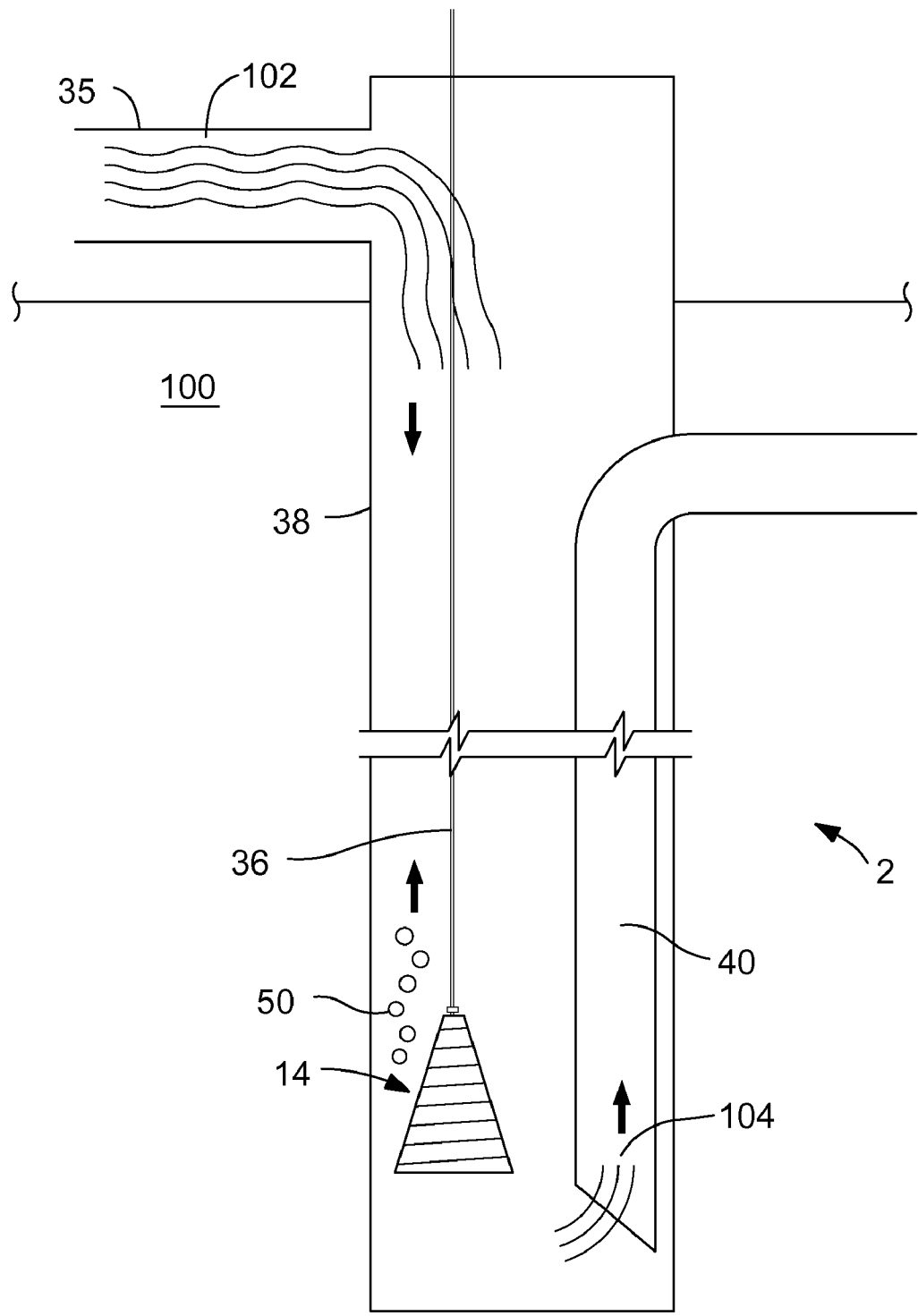
FIG. 2 is a cross sectional view of a counter current supersaturation oxygenation system with an upflow tube located on an inside of a down flow tube in accordance with the present invention.

With reference to FIG. 2, an upflow tube 40 may also be located inside a down flow tube 38. An entrance to the upflow tube 40 is located below the gas diffuser 14. The other end of the upflow tube 40 extends through a wall of the down flow tube 38, above the gas diffuser 14.

Figure 3:
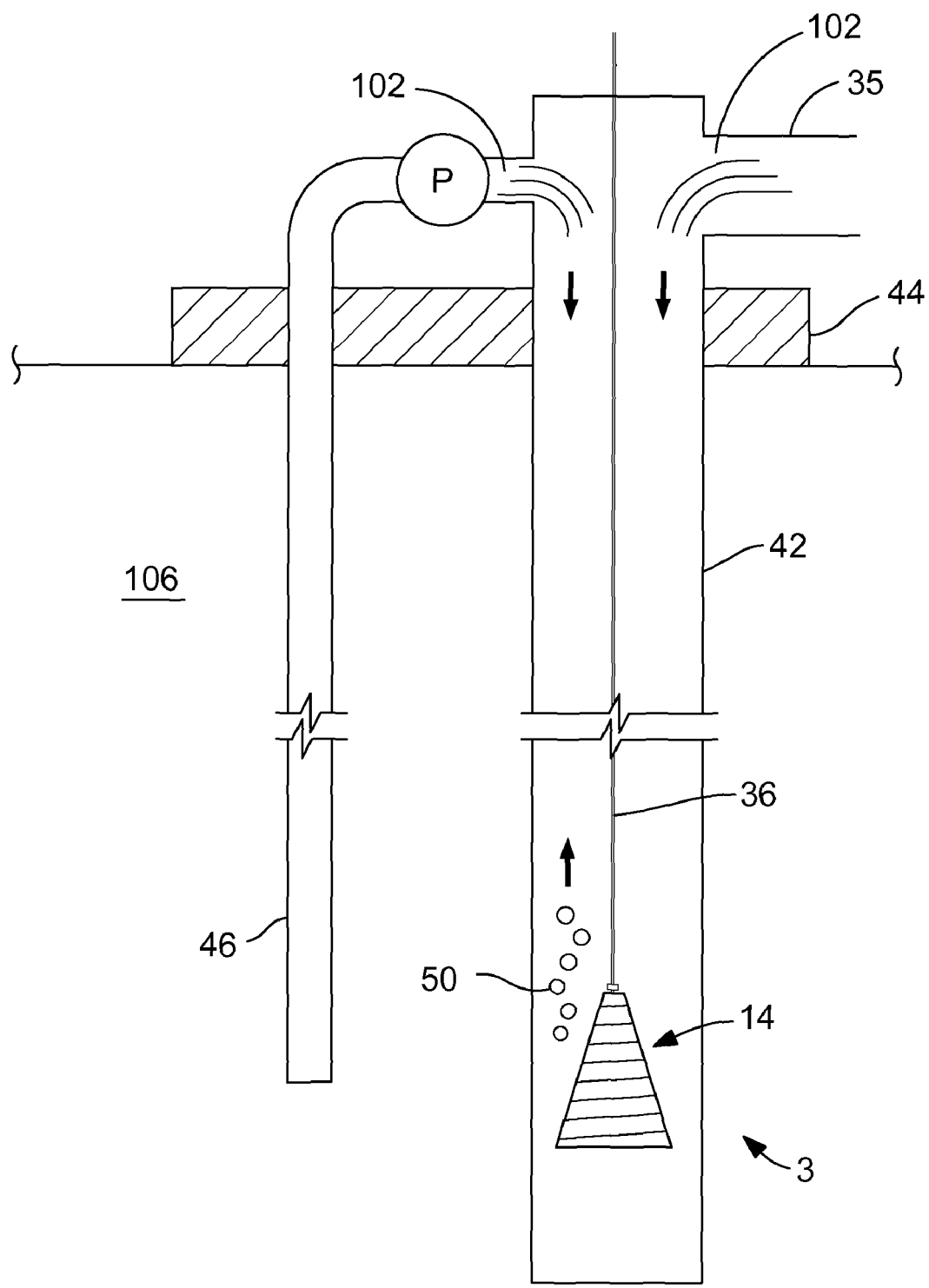
FIG. 3 is a cross sectional view of a second embodiment of a counter current supersaturation oxygenation system in accordance with the present invention.

With reference to FIG. 3, a second embodiment of the counter current supersaturation oxygenation system preferably includes a down flow tube 42, the gas diffuser 14 and a buoyant platform 44. The buoyant platform 44 is set in a body of liquid 106, such as a retention pond, a pond, reservoir or a lake. A top of the down flow tube 42 is retained by the buoyant platform 44. The gas diffuser 14 is suspended inside the down flow tube 42 at substantially a bottom thereof. The stream of liquid 102 is flowed down the down flow tube 42 through either the liquid supply tube 35 or the upflow tube 46. If the upflow tube 46 is used to supply the stream of liquid 102, a pump 48 is used to draw liquid from the body of liquid 106 and flow the stream of liquid 102 into the down flow tube 42. It is preferable to use the upflow tube 46 and the pump 48 instead of the liquid supply tube 35, when there is an extreme thermocline between the surface liquid and the liquid at a bottom of the body of water 106. A bottom of the upflow tube 46 is located away from a bottom of the down flow tube 42 to prevent oxygenated water from being pulled into the upflow tube 46.

The stream of liquid 102 is flowed down the down flow tube 10, 38, 42. A depth of the down flow tube 10, 38, 42 is at least 20 feet. A liquid, such as water or waste water may be saturated by volume with oxygen in a 10:1 ratio, where 1 cubic foot may be dissolved into 10 cubic feet of water. An increased depth of the down flow tube 10, 38, 42 will provide more efficient oxygenation of the liquid 102, because of increased amount of time it takes for the oxygen bubbles 50 to exit a top of the down flow tube 10, 38, 42. The stream of liquid becomes oxygenated by passing through the down flow tube 10, 38, 42. The oxygen bubbles 50 travel-up through the liquid stream 102 from the gas diffuser 14.

The preferred flow rate of liquid down the down flow tube 10, 38, 42 cannot exceed one foot/second. The preferred flow rate of liquid traveling up the upflow tube 12, 40. 46 cannot exceed five feet/second. If a large quantity of oxygen bubbles 50 come out of an open top of the upflow tube 12, 40, the velocity of the liquid 102 going down the down flow tube 10, 38 is too fast. It is normal to have some oxygen bubbles 50 come out of the open top of the down flow tube 10, 38, 42. The oxygenated liquid 104 flows up the upflow tube 12, 40, 46 to any appropriate destination. The depth and perimeter of the down flow tube is determined by the oxygenation needs of the liquid and the amount of liquid to be oxygenated.

The liquid may be any liquid, which is oxygenated for some purpose, such as water and waste water sludge. The waste water sludge is oxygenated to increase the amount of bacteria placed in the waste water sludge for consuming undesirable organic material in the waste water sludge. Organic consuming bacteria needs oxygen to live and multiply.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A counter current supersaturation oxygenation system comprising:
   a down flow tube having a top and a bottom;
   an upflow tube having one end communicating with said down flow tube at substantially said bottom of said down flow tube; and
   a gas diffuser having a substantially funnel shape, said gas diffuser includes a gas tube, said gas tube includes a plurality of openings for emitting a gas containing oxygen, said gas diffuser is retained in substantially said bottom of said down flow tube, wherein a stream of liquid is flowed down said down flow tube at substantially said top thereof, said stream of liquid becoming oxygenized when flowing down said down flow tube.

2. The counter current supersaturation oxygenation system of claim 1 wherein:
   a smaller perimeter of said gas diffuser is located at a top of said gas diffuser.

3. The counter current supersaturation oxygenation system of claim 1, further comprising:
   said gas diffuser includes a funnel frame, said gas supply tube is porous, said gas tube is retained on said funnel frame.

4. The counter current supersaturation oxygenation system of claim 1 wherein:
   said down flow tube is a subterranean shaft formed in the ground.

5. The counter current supersaturation oxygenation system of claim 1, further comprising:
a pneumatic T-connector includes a first end leg, a second end leg and a T-leg, a gas supply hose is connected to said first end leg, one end of said gas tube is connected to said second end leg and the other end of said gas tube is connected to said T-leg.

6. The counter current supersaturation oxygenation system of claim 1 wherein:
the stream of liquid is a waste water sludge.

7. The counter current supersaturation oxygenation system of claim 1, further comprising:
the other end of said upflow tube extends above said gas diffuser.

8. The counter current supersaturation oxygenation system of claim 1, further comprising:
said down flow tube having a depth of at least 20 feet.

9. A counter current supersaturation oxygenation system comprising:
a down flow tube having a top and a bottom;
an upflow tube having one end communicating with said down flow tube at substantially said bottom of said down flow tube; and
a gas diffuser having a substantially funnel shape, a smaller perimeter of said gas diffuser is located at a top of said gas diffuser, said gas diffuser includes a gas tube, said gas tube includes a plurality of openings for emitting a gas containing oxygen, said gas diffuser is retained in substantially said bottom of said down flow tube, wherein a stream of liquid is flowed down said down flow tube at substantially said top thereof, said stream of liquid becoming oxygenized when flowing down said down flow tube.

10. The counter current supersaturation oxygenation system of claim 9, further comprising:
said gas diffuser includes a funnel frame, said gas supply tube is porous, said gas tube is retained on said funnel frame.

11. The counter current supersaturation oxygenation system of claim 9 wherein:
said down flow tube is a subterranean shaft formed in the ground.

12. The counter current supersaturation oxygenation system of claim 9, further comprising:
a pneumatic T-connector includes a first end leg, a second end leg and a T-leg, a gas supply hose is connected to said first end leg, one end of said gas tube is connected to said second end leg and the other end of said gas tube is connected to said T-leg.

13. The counter current supersaturation oxygenation system of claim 9 wherein:
the stream of liquid is a waste water sludge.

14. The counter current supersaturation oxygenation system of claim 9, further comprising:
said down flow tube having a depth of at least 20 feet.

\* \* \* \* \*

UNITED STATES PATENT AND TRADEMARK OFFICE
CERTIFICATE OF CORRECTION

| | | |
|---|---|---|
| PATENT NO. | : 7,900,895 B1 | Page 1 of 1 |
| APPLICATION NO. | : 12/856692 | |
| DATED | : March 8, 2011 | |
| INVENTOR(S) | : Dean E. Farrell and Ronald W. Ketler | |

It is certified that error appears in the above-identified patent and that said Letters Patent is hereby corrected as shown below:

Title page, item [75] should read as follows:
Ronald W. Ketler.

Signed and Sealed this
Nineteenth Day of July, 2011

David J. Kappos
*Director of the United States Patent and Trademark Office*